US011675918B2

(12) United States Patent
Ojha

(10) Patent No.: US 11,675,918 B2
(45) Date of Patent: Jun. 13, 2023

(54) POLICY-BASED USER DEVICE SECURITY CHECKS

(71) Applicant: Box, Inc., Redwood City, CA (US)

(72) Inventor: Alok Ojha, Newark, CA (US)

(73) Assignee: Box, Inc., Redwood City, CA (US)

( * ) Notice: Subject to any disclaimer, the term of this patent is extended or adjusted under 35 U.S.C. 154(b) by 108 days.

(21) Appl. No.: 16/553,063

(22) Filed: Aug. 27, 2019

(65) Prior Publication Data

US 2020/0089892 A1 Mar. 19, 2020

Related U.S. Application Data

(60) Provisional application No. 62/723,314, filed on Aug. 27, 2018.

(51) Int. Cl.
*H04L 29/06* (2006.01)
*G06F 21/62* (2013.01)
(Continued)

(52) U.S. Cl.
CPC .......... *G06F 21/6218* (2013.01); *G06F 16/11* (2019.01); *G06F 21/53* (2013.01); *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/55* (2022.05); *G06F 2221/034* (2013.01)

(58) Field of Classification Search
CPC .... G06F 21/6218; G06F 21/05; G06F 21/577; G06F 21/6227; H04L 63/102; H04L 63/105; H04L 63/1416; H04L 63/107
USPC .......................................................... 726/1
See application file for complete search history.

(56) References Cited

U.S. PATENT DOCUMENTS 10,552,590 B2 * 2/2020 Hamlin ................ H04L 63/105
10,726,152 B1 7/2020 Durham et al.
(Continued)

OTHER PUBLICATIONS

International Search Report and Written Opinion dated Dec. 11, 2019 for PCT Appln. No. PCT/US19/48435.
(Continued)

*Primary Examiner* — Longbit Chai
(74) *Attorney, Agent, or Firm* — Vista IP Law Group, LLP

(57) ABSTRACT

A collaboration system manages a plurality of content objects that are shared by multiple users at corresponding user devices in corresponding computing environments. Policies that govern interactions over the plurality of content objects are established. A content object upload request from a first user belonging to a first enterprise is processed by the collaboration system and then the content object is shared with a second user of a second enterprise. Security characteristics pertaining to the second user, and/or the second enterprise, and/or the second user's devices are initially unknown or unverified. As such, upon receiving interaction events raised by a user device of the second user, a set of interaction attributes associated with the interaction events are gathered. One or more trust policies are applied to the interaction attributes to evaluate security conditions that correspond to the interaction events. A response is generated based on the evaluated security conditions.

20 Claims, 12 Drawing Sheets

(51) Int. Cl.
    *G06F 16/11*      (2019.01)
    *G06F 21/53*      (2013.01)
    *H04L 9/40*       (2022.01)
    *H04L 67/06*      (2022.01)
    *G06N 20/00*      (2019.01)
    *G06N 5/04*       (2023.01)
    *G06F 21/57*      (2013.01)
    *H04L 67/55*      (2022.01)

(56) References Cited

U.S. PATENT DOCUMENTS

| | | | |
|---|---|---|---|
| 10,902,072 B2* | 1/2021 | Anders | G06Q 30/0201 |
| 10,979,432 B1 | 4/2021 | Frank et al. | |
| 2003/0018890 A1 | 1/2003 | Hale et al. | |
| 2009/0307746 A1* | 12/2009 | Di | H04W 12/088 |
| | | | 726/1 |
| 2014/0208425 A1* | 7/2014 | Palomaki | G06F 21/565 |
| | | | 726/23 |
| 2015/0089575 A1 | 3/2015 | Vepa et al. | |
| 2015/0227756 A1 | 8/2015 | Barbas | |
| 2016/0070758 A1 | 3/2016 | Thomson et al. | |
| 2016/0117495 A1 | 4/2016 | Li et al. | |
| 2018/0114015 A1 | 4/2018 | Nuseibeh et al. | |
| 2018/0124609 A1 | 5/2018 | Ciano et al. | |
| 2020/0092337 A1 | 5/2018 | Ciano et al. | |

OTHER PUBLICATIONS

Non-Final Office Action for U.S. Appl. No. 16/553,057 dated Feb. 17, 2022.

European Search Report dated Sep. 20, 2021 for related EP Application No. 19853611.2.

Final Office Action dated Jul. 21, 2022; U.S. Appl. No. 16/553,057.

De Filippi, P., et al., "Cloud Computing: Centralization and Data Sovereignty," dated 2012, electronic copy available at: https://ssrn.com/abstract=2167372.

Chen, Y., et al. "What's New About Cloud Computing Security?" Electrical Engineering and Computer Sciences University of California at Berkeley, Technical Report No. UCB/EECS-2010-5, http://www.eecs.berkeley.edu/Pubs/TechRpts/2010/EECS-2010-5.html, dated Jan. 20, 2010.

J. Alqatawna, E. Rissanen and B. Sadighi, "Overriding of Access Control in XACML," Eighth IEEE International Workshop on Policies for Distributed Systems and Networks (Policy'07), 2007, pp. 87-95 (Year: 2007).

Non-Final Office Action for U.S. Appl. No. 16/948,828 dated Jul. 22, 2022.

Notice of Allowance for U.S. Appl. No. 16/948,828 dated Nov. 16, 2022.

* cited by examiner

POLICY-BASED USER DEVICE SECURITY CHECKS

RELATED APPLICATIONS

The present application claims the benefit of priority to U.S. Patent Application Ser. No. 62/723,314 titled "COLLABORATION SYSTEM SECURITY", filed on Aug. 27, 2018, which is hereby incorporated by reference in its entirety.

FIELD

This disclosure relates to content management systems, and more particularly to techniques for performing policy-based user device security checks.

BACKGROUND

Cloud-based content management services and systems have impacted the way computer-readable content objects (e.g., documents, spreadsheets, images, programming code files, etc.) are stored. Furthermore, adoption and use of many different types of devices for carrying out various collaboration activities has also impacted the way both personal and enterprise content objects are shared and managed. Specifically, modern content management systems provide the ability to securely share large volumes of content objects among trusted users (e.g., collaborators) on a variety of user devices such as mobile phones, tablets, laptop computers, desktop computers, and/or other devices. In some systems, sharing and collaboration activities include one or more interactions (e.g., authoring, editing, viewing, etc.) that are performed over the content objects using the full range of the aforementioned user devices. Such interactions may be performed by one user, or by multiple users, and/or even autonomously by one or more computing entities (e.g., processes, agents, applications, etc.). Moreover, such interactions may span across multiple departments and/or multiple enterprises.

In modern content management systems, the security of the content objects is maintained at least in part by governing the aforementioned interactions over the content objects in accordance with sets of access permissions associated with the various combinations of content objects and users. Even user-to-user collaboration activities—which might not involve any particular content object—are also governed by access permissions associated with the users. As such, when certain collaborative relationships (e.g., between users, between users and content objects, etc.) are established, access permissions are concomitantly assigned to the entities (e.g., users, content objects, etc.). Such access permissions serve to govern the scope of interactions that are allowed or denied.

Some interactions over the content objects involve local instances (e.g., copies) of certain content objects being locally stored on the user devices of the users. For example, a user might download (e.g., to a laptop) a shared document from a content management system such that the downloaded copy can be used (e.g., for editing) even while the user device is offline. As another example, a user might upload a photograph to the content management system to facilitate sharing of the photograph with various other users. In these and other cases, the content objects are exposed to the operating systems and other agents of user devices for at least some period of time, which exposure can present security risks (e.g., leakage of the content objects, misappropriation of the content objects, etc.). As merely examples, such security risks might pertain to viruses and/or malware being introduced to the content objects while stored at the user devices, and/or such security risks might pertain to a lack of encryption of the content objects while stored at the user devices, and/or such security risks might pertain to other individual or combinations of security deficiencies.

Unfortunately, in content management systems with large numbers of users who use many different types of user devices, there are no mechanisms for vetting the user devices that are involved in interactions with the content objects managed by the system. As a consequence, such user devices present security risks that need to be addressed.

Specifically, consider a first user at an enterprise who shares a document with a second user for shared editing purposes. In this example, consider that the second user is not a member of the first enterprise nor is the second user a managed user of the content management system. Continuing this example, and in response to the second user receiving the invitation to edit the document at his or her user device, a download request from the user device is issued to the content management system. While the collaborative relationship between the users and the respective access privileges (e.g., editing privileges) of the users may be governed by access permissions established at the content management system, the user device of the second user presents an unknown security risk for the document.

One approach is to have all users register all possible user devices with the content management system before using such devices to interact with the content objects. This approach is deficient in today's content management systems having such dynamic numbers and/or mixes of users and/or user devices. Another approach is to uniformly deny various types of interactions. This approach is also deficient in today's content management systems because it arbitrarily restricts the very types of collaboration that content management systems are intended to facilitate. What is needed is a way to dynamically vet the security risk of user devices in response to content object interactions invoked from the users' devices.

SUMMARY

The present disclosure describes techniques used in systems, methods, and in computer program products for policy-based user device security checks, which techniques advance the relevant technologies to address technological issues with legacy approaches. More specifically, the present disclosure describes techniques used in systems, methods, and in computer program products for dynamically vetting user devices to avoid security vulnerabilities. Certain embodiments are directed to technological solutions for analyzing the attributes of shared content object interactions invoked by unvetted user devices to determine which security conditions must be present before performing the requested interactions over the shared content object.

The disclosed embodiments modify and improve over legacy approaches. In particular, the herein-disclosed techniques provide technical solutions that address the technical problems attendant to assessing leakage and other security risks presented by unknown user devices. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps for analyzing the attributes of shared content object interactions invoked by unvetted user devices to determine which security conditions must be present before performing the requested interactions over the shared content object. The disclosed techniques for analyzing the attributes of shared content object interactions invoked by unvetted user devices, and then allowing or denying certain of the interactions, serve to overcome long standing yet heretofore unsolved technological problems that arise in the realm of computerized collaboration systems.

Many of the herein-disclosed embodiments for analyzing the attributes of shared content object interactions invoked by unvetted user devices are technological solutions pertaining to technological problems that arise in the hardware and software arts that underlie content management systems. Aspects of the present disclosure achieve performance and other improvements in peripheral technical fields including (but not limited to) distributed storage systems and computer data security.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
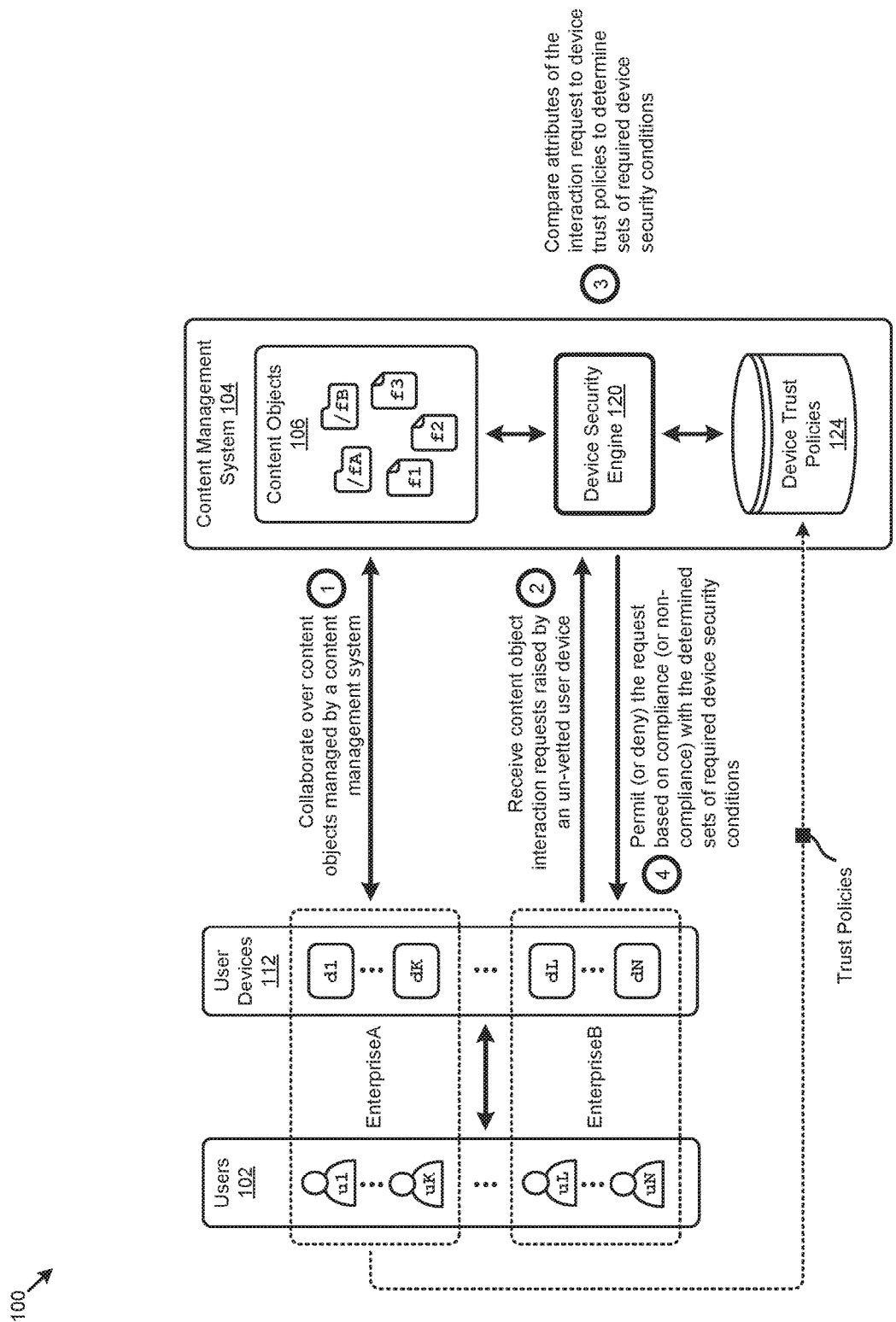
FIG. 1 exemplifies a computing environment in which embodiments of the present disclosure can be implemented.

Aspects of the present disclosure solve problems associated with using computer systems for assessing leakage and other security risks presented by unknown user devices. These problems are unique to, and may have been created by, various computer-implemented methods that are practiced in the context of content management systems. Some embodiments are directed to approaches for analyzing the attributes of shared content object interactions invoked by unvetted user devices to determine which security conditions must be present before performing the requested interactions over the shared content object. The accompanying figures and discussions herein present example environments, systems, methods, and computer program products for dynamically vetting user devices to avoid security vulnerabilities.

Overview

Disclosed herein are techniques for analyzing the attributes of content object interactions invoked at user devices so as to determine the device security conditions necessary to perform the interactions at the user devices. In certain embodiments, such techniques are implemented in a content management system that facilitates interactions over a plurality of shared content objects that are shared by multiple users who employ respective user devices. In exemplary embodiments, instances of device trust policies are established at the content management system to govern the interactions over the content objects.

Specifically, when various interaction requests invoked from the user devices are identified, certain interaction attributes corresponding to the interaction requests are gathered and considered with respect to applicable device trust policies to determine sets of device security conditions. The security conditions are required to be present at a subject user device before certain actions are permitted to be performed by the content management system and/or by the user device. Security conditions may apply to a network, and/or to a geography and/or to a computer or type of computer and/or to any sort of a device that is a part of, or is connected to a network. As merely one example of a device security condition, an antivirus agent might be required to be operational at a subject user device before a content object can be downloaded to the user's device. In some cases, a particular set of security conditions might characterize a particular trust level associated with a user and/or his or her user device.

Responses to the interaction requests are issued in accordance with predetermined sets of device security conditions. In the foregoing example, a response may involve additional checks of the user's device to determine if an antivirus agent is installed and operating at the device. In certain embodiments, a trust agent is provisioned to the user's device to assess the compliance of the user's device with respect to the device security conditions. In certain embodiments, a virtual system environment (e.g., "sandbox") is implemented at the content management system to assess security risks presented by the subject user's device.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates operations for analyzing the attributes of shared content object interactions invoked by unvetted user devices to determine which security conditions must be present before performing the requested interactions over the shared content object. Specifically, the figure presents a logical depiction of how the herein disclosed techniques can be used to vet user devices before using them to interact with content objects management at a content management system (e.g., collaboration system). A representative sequence of high order operations is presented to illustrate how the herein disclosed techniques might be carried out in computing environment 100.

The logical depiction of FIG. 1 depicts a representative set of users 102 (e.g., user "u1", . . . , user "UK", user "uL", . . . , user "uN") who desire to interact (e.g., author, edit, view, etc.) with various instances of content objects 106 managed at a content management system 104 for sharing, collaboration and/or other purposes. The interactions may be performed by one user, or by multiple users, and/or even autonomously by one or more computing entities (e.g., processes, agents, applications, etc.) through corresponding instances of user devices 112 (e.g., device "d1", . . . , device "dK", . . . , device "dL", . . . , device "dN") such as smart phones, tablets, laptop computers, desktop computers, virtual machines, servers, and other devices. Moreover, such interactions may span across multiple departments and/or multiple enterprises. As can be observed, a first portion (e.g., user "u1", . . . , user "UK") of users 102 are associated with "EnterpriseA" and a second portion (e.g., user "uL", . . . , user "uN") of users 102 are associated with "EnterpriseB".

Consider a case in which users of "EnterpriseA" are managed users of content management system 104. Also consider in the same situation that "EnterpriseA" owns at least some of content objects 106. In this situation, the managed users of "EnterpriseA" may use their respective user devices (e.g., device "d1", . . . , device "dK") to perform interactions over content objects 106 as they collaborate within the enterprise over the content objects. Such user devices of managed users are often referred to as 'managed devices'. Managed users of "EnterpriseA" may also collaborate over content objects 106 with users external to "EnterpriseA". Such external users may be users that are not managed users of content management system 104. For example, managed users of "EnterpriseA" may invite users of "EnterpriseB" (e.g., unmanaged users) to perform certain interactions over content objects 106, which interactions will be performed by the users at their respective user devices (e.g., device "dL", . . . , device "dN").

As earlier mentioned, some of the aforementioned interactions over content objects 106 involve instances (e.g., copies) of certain content objects being locally stored on the user devices of the users. For example, user "uL" might download a file "f2" from content management system 104 to device "dL" such that the downloaded copy can be used (e.g., for editing) while device "dL" is offline. As another example, user "uN" might upload file "f3" to content management system 104 to facilitate sharing of the file with various other users.

In these and other cases, the content objects are exposed to the operating systems and other agents of the user devices for at least some period of time, which exposure can present security risks (e.g., leakage of the content objects, corruption of the content objects, etc.). Such security risks associated with user devices 112 are presented to content management system 104 at least as often as every time a user device not previously used to access content management system 104 (e.g., an unknown user device) is used to access content management system 104. In some cases, such security risks are precipitated by configuration changes (e.g., removal of an antivirus program) associated with one or more of the user devices. Security risks can be associated with the user devices of managed users (e.g., "EnterpriseA" users) and/or unmanaged users (e.g., "EnterpriseB" users).

The herein disclosed techniques address such challenges pertaining to assessing the security risks presented by unknown user devices at least in part by analyzing the attributes of content object interactions invoked at user devices so as to determine the device security conditions necessary to perform the interactions at the user devices. In the embodiment of FIG. 1, the techniques are facilitated at least in part by a device security engine 120 and a set of trust policies (e.g., the shown device trust policies 124). Such trust policies may be established by one or more of the managed users from users 102 (e.g., "EnterpriseA" system administrators, etc.). As users 102 collaborate over content objects 106 using user devices 112 (operation 1), instances of interaction requests over the content objects are identified (operation 2).

For example, device security engine 120 might identify a download request for file "f2" invoked from device "dL" or user "uL". The interaction attributes that describe the interaction requests are applied to device trust policies 124 by device security engine 120 to determine sets of device security conditions (operation 3). Each set of device security conditions comprises one or more measurable and quantifiable conditions that are to be exhibited by a user device to perform one or more interactions over one or more content objects at the user device. A particular set of device security conditions can thereby be specific to some or all of, a user device, an interaction, or a content object.

Responses to the interaction requests are issued to the invoking user devices in accordance with the sets of device security conditions (operation 4). Such responses may (1) allow one or more interactions associated with the interaction requests, or (2) block one or more interactions associated with the interaction requests, and/or (3) request additional information (e.g., device configuration information) from the user devices. In the foregoing scenario, for example, the download of file "f2" to device "dL" may be allowed or blocked in accordance with the device security conditions identified for the corresponding download request. As another example, a response to device "dL" may include instructions for extracting information about the configuration of device "dL" to facilitate a comparison of the capabilities of device "dL" to the device security conditions. The download of file "f2" may then be allowed or blocked based at least in part on the results of the comparison.

The user device security vetting capability facilitated by the herein disclosed techniques serves to address the problems attendant to assessing the security risks presented by unknown user devices that are used to access shared content objects managed by a content management system (e.g., collaboration system). As such, application of the techniques disclosed herein facilitate improvements in computer functionality that serve to reduce the demand for computer memory, reduce the demand for computer processing power, reduce network bandwidth use, and reduce the demand for intercomponent communication. Specifically, consumption of such computing resources to facilitate manual user device registration and/or recovery of leaked and/or corrupted content objects is eliminated.

One embodiment of techniques for such user device security vetting is disclosed in further detail as follows.

Figure 2:
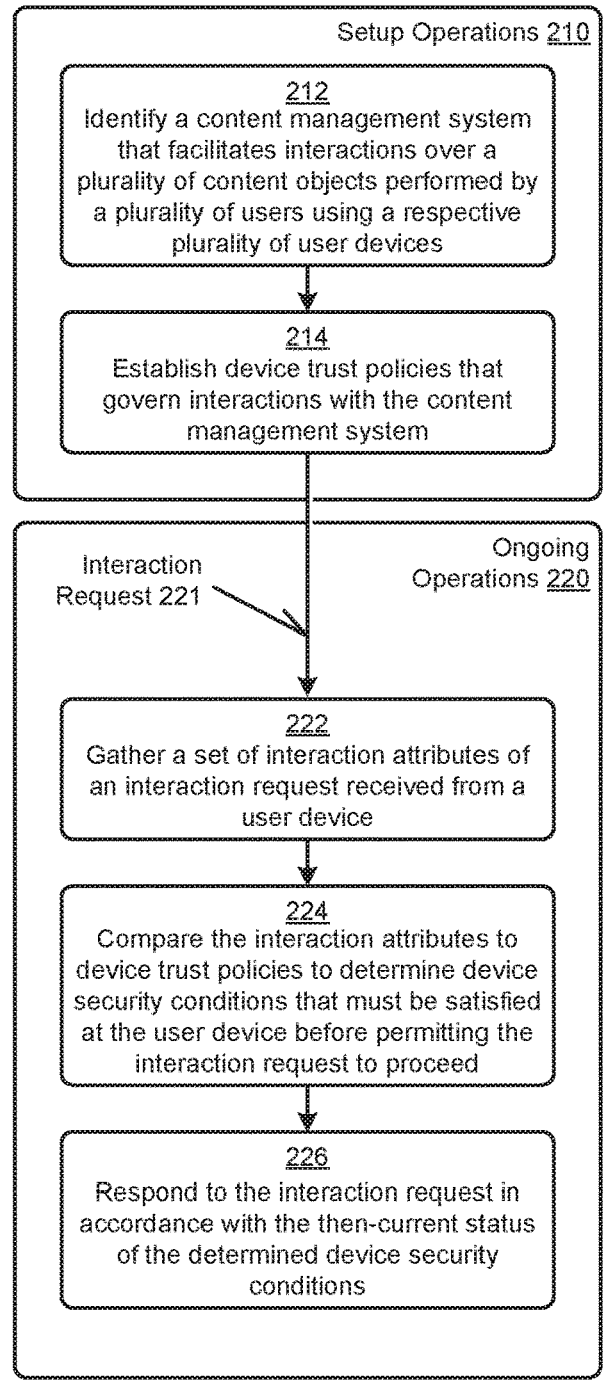
FIG. 2 depicts a policy-based user device security vetting technique as implemented in systems that facilitate dynamic vetting of user devices to avoid security vulnerabilities when accessing shared content objects, according to an embodiment.

FIG. 2 depicts a policy-based user device security vetting technique 200 as implemented in systems that facilitate dynamic vetting of user devices to avoid security vulnerabilities when accessing shared content objects. As an option, one or more variations of policy-based user device security vetting technique 200 or any aspect thereof may be implemented in the context of the architecture and functionality of the embodiments described herein. The policy-based user device security vetting technique 200 or any aspect thereof may be implemented in any environment.

FIG. 2 illustrates aspects pertaining to analyzing the attributes of shared content object interactions invoked by unvetted user devices to determine which security conditions must be present before performing the requested interactions over the shared content object. Specifically, the figure is presented to illustrate one embodiment of certain steps and/or operations performed over a network of devices (e.g., user devices, computing systems, etc.) to determine sets of device security conditions that are to be satisfied at respective user devices before performing certain interactions with content objects at the user devices. As can be observed, the steps and/or operations can be grouped into a set of setup operations 210 and a set of ongoing operations 220.

Setup operations 210 of policy-based user device security vetting technique 200 commences by identifying a content management system that facilitates interactions over a plurality of users and a plurality of content objects performed at a plurality of user devices (step 212). Such interactions can involve both user-to-user interactions and user-to-content interactions. One or more device trust policies are established at the content management system to govern the interactions performed at the user devices (step 214). As used herein, a trust policy comprises a collection of electronically-stored parameters that serve to constrain one or more computing system operations. More specifically, a trust policy comprises a set of parameters that are evaluated subject to the attributes associated with an interaction request so as to determine whether or not certain conditions pertaining to the user device are present. Some or all of such conditions need to be satisfied before performing the one or more interactions associated with the interaction event.

As depicted in ongoing operations 220, when an interaction request 221 invoked by a user device is received, the respective interaction attributes of the interaction request 221 are gathered (step 222). Such interaction attributes can comprise event attributes and other attributes derived from the event attributes (e.g., user attributes, object attributes, device attributes, etc.) that correspond to the interaction request. The interaction attributes of the interaction request are compared against the device trust policies to determine respective sets of device security conditions that correspond to the interaction request and the specific user device that raised the interaction request (step 224).

As merely one example, the policy parameters of the device trust policies might codify sets of device security rules that are evaluated subject to the interaction attributes to determine an applicable set of device security conditions for a particular user device. A response or multiple responses to the interaction request are generated and issued in accordance with the respective sets of device security conditions (step 226). As examples, such responses might allow an interaction at a user device, or might block an interaction at a user device, and/or might request certain user device information (e.g., device configuration information) from a user device.

One embodiment of a system, data flows, and data structures for implementing the policy-based user device security vetting technique 200 and/or other herein disclosed techniques, is disclosed as follows.

Figure 3:
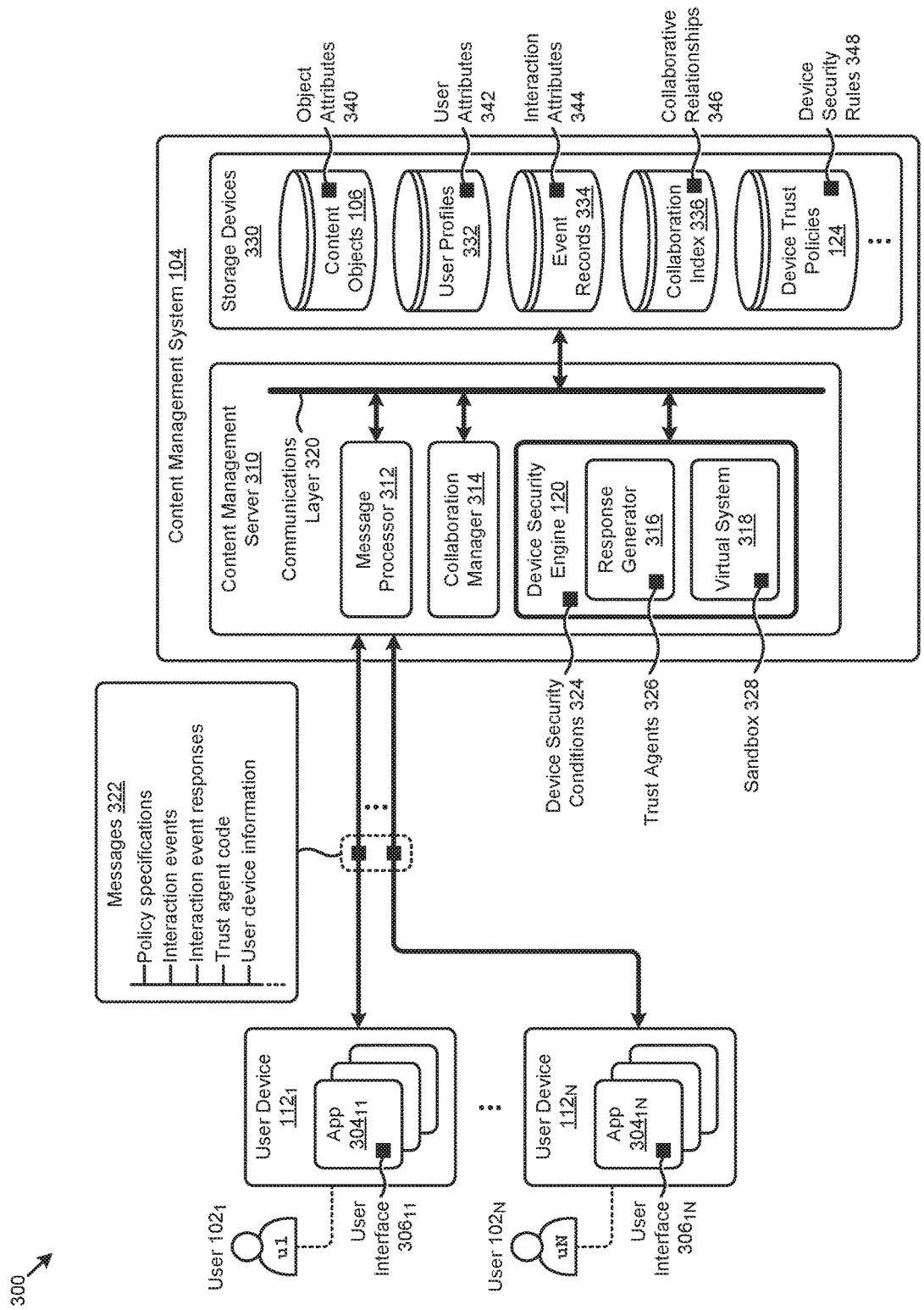
FIG. 3 is a block diagram of a system for dynamically vetting user devices to avoid security vulnerabilities when accessing shared content objects, according to an embodiment.

FIG. 3 is a block diagram of a system 300 for dynamically vetting user devices to avoid security vulnerabilities when accessing shared content objects. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to analyzing the attributes of shared content object interactions invoked by unvetted user devices to determine which security conditions must be present before performing the requested interactions over the shared content object. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $102_1$, . . . , user $102_N$) that interact with each other and a set of content objects 106 managed at a content management system 104. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of a content management server 310 operating at content management system 104. Content management server 310 comprises an instance of a message processor 312, an instance of a collaboration manager 314, and an instance of a device security engine 120, which comprises an instance of a response generator 316 and an instance of a virtual system 318. A plurality of instances of the foregoing components might operate at a plurality of instances of servers (e.g., content management server 310) at content management system 104 and/or any portion of system 300.

Such instances can interact with a communications layer 320 to access each other and/or a set of storage devices 330 that store various information to support the operation of the components of system 300 and/or any implementations of the herein disclosed techniques. For example, the servers and/or storage devices of content management system 104 might facilitate interactions over content objects 106 by the users (e.g., user $102_1$, . . . , user $102_N$) from a respective set of user devices (e.g., user device $112_1$, . . . , user device $112_N$). A content management system "manages" a plurality of content objects at least in part by maintaining (e.g., storing, updating, resolving interaction conflicts, etc.) the content objects subject to the various interactions performed over the content objects by the users of the content objects at their respective user devices. The content objects (e.g., files, folders, etc.) in content objects 106 are characterized at least in part by a set of object attributes 340 (e.g., content object metadata) stored at storage devices 330. Furthermore, at least some of the users (e.g., the managed users) are characterized at least in part by a set of user attributes 342 stored in a set of user profiles 332 at storage devices 330.

The users access instances of applications (e.g., app $304_{11}$, . . . app $304_{1N}$) operating at their respective user devices to interact with the content objects 106 managed by content management system 104. Such applications might comprise native applications provided by content management system 104 or third-party applications that are integrated with content management system 104 to facilitate the interactions performed over the content objects managed by the system. Various information pertaining to such integrations with content management system 104 might be codified in a registry at content management system 104. As indicated, the applications often present user interfaces (e.g., user interface $306_{11}$, . . . , user interface $306_{1N}$) to the users to facilitate the interactions with content objects 106 and/or other communications with content management server 310 and/or content management system 104.

Specifically, the instances of the applications operating at the user devices send or receive various instances of messages 322 that are received or sent by message processor 312 at content management server 310. In some cases, messages 322 are sent to or received from content management server 310 without human interaction. One class of messages 322 pertains to the policy specifications and any constituent parameters that can be used to characterize device trust policies 124. Such messages might be invoked, for example, by and when a system administrator (e.g., admin) submits a policy creation form at a user interface of an application. In this case, the policy parameters derived from the information specified by the system administrator in the form are embedded in one or more instances of messages 322 and delivered to message processor 312. The policy parameters are forwarded to device security engine 120 for analysis and storage in device trust policies 124. Such analysis may include certain conflict remediation operations performed by device security engine 120. Conflict remediation may be applied when multiple parties specify conflicting policy parameters. The multiples parties may be within one enterprise or over two or more enterprises.

Another class of messages 322 corresponds to interaction events that are invoked at the user devices as the users interact with, or attempt to interact with, content objects 106. As examples, the users might log in to any of the applications to interact with content objects they own or that are shared with them, and/or might log in to any of the applications to invite other users to collaborate on content objects, and/or to might log in to any of the applications to perform other collaboration activities. Any of the foregoing content object interactions or collaboration activities can be characterized as interaction events. Message processor 312 at content management server 310 monitors occurrences of messages 322 to identify the interaction events performed over the plurality of user devices.

Message processor 312 codifies certain of the interaction attributes 344 pertaining to the interaction events in a set of event records 334 that are stored in storage devices 330. In some cases, message processor 312 will access the user attributes 342 (e.g., user enterprise identifiers, user device information associated with the users, etc.) stored in user profiles 332 and/or object attributes 340 (e.g., content object types, etc.) stored in content objects 106 to facilitate populating the interaction attributes 344 that constitute the event records 334. The event records 334 and/or any other data described herein can be organized and/or stored using various techniques. For example, event records 334 might be organized and/or stored in a tabular structure (e.g., relational database table) that has rows that relate various interaction attributes with a particular interaction event. As another example, the event data might be organized and/or stored in a programming code object that has instances corresponding to a particular interaction event and properties that describe the various interaction attributes associated with the event.

When interaction events are identified at message processor 312, collaboration manager 314 accesses a collaboration index 336 stored in storage devices 330 to determine the access permissions associated with the interaction events. Specifically, collaboration manager 314 queries the collaborative relationships 346 codified in collaboration index 336 to determine the content access privileges (if any) provisioned to the users associated with the interaction events.

For example, a collaborative relationship in collaboration index 336 might indicate that user $102_1$ and three other users have editing privileges over a certain content object (e.g., contract document). If the interaction or interactions (e.g., downloading, viewing, editing, etc.) associated with the interaction events are permitted according to collaboration index 336, collaboration manager 314 calls the device security engine 120 to determine any sets of device security conditions 324 that are to be enforced on the user devices of the users associated with the interaction events. Specifically, device security engine 120 applies the interaction attributes of the interaction events to the device trust policies 124 to determine the respective sets of device security conditions for the events. As shown, some or all of the interaction attributes may be applied to sets of device security rules 348 associated with respective instances of the device trust policies 124 to facilitate the determination of the device security conditions.

Response generator 316 receives the sets of device security conditions 324 determined by device security engine 120 to generate and issue responses to the sources of the interaction events. Specifically, interaction event responses generated by response generator 316 are issued as instances of messages 322 to the user devices of the users. For example, consider an interaction event that pertains to an upload of a content object from user device $112_N$ to facilitate sharing of the content object with other users. A set of device security conditions corresponding to this interaction event indicates that the content object can be uploaded if user device $112_N$ has an installed antivirus program and a file encryption capability. If user device $112_N$ satisfies these conditions, an interaction event response that invokes the upload of the content object might be issued to the user device. If user device $112_N$ does not satisfy one or both of these conditions, an interaction event response that blocks the upload of the content object (e.g., with an explanation as to why it is blocked) might be issued to the user device.

In some cases, an interaction event response can comprise instances of one or more trust agents 326 that are delivered to the user devices to perform certain operations. As merely one example, a trust agent may be delivered in one or more instances of messages 322. Once downloaded and configured for operation on the user device, the trust agent or agents might scan the user device to extract certain information pertaining to the configuration and/or capabilities of the device. This user device information is then compared to a respective set of device security conditions to determine if the user device is permitted to perform certain interactions. In other cases, certain operations might be performed over one or more content objects associated with an interaction event in virtual system 318. Specifically, a "sandbox" (e.g., sandbox 328) that is isolated from the other components of content management system 104 might be implemented in virtual system 318 to check or test certain content objects (e.g., executable code objects) for security issues without risking the integrity of the content management system 104. In the foregoing upload scenario, for example, the content object uploaded from user device $112_N$ might be tested in sandbox 328 for malware before storing the content object (e.g., in contents object 106) in storage devices 330 of content management system 104.

Further details pertaining to techniques for establishing (e.g., specifying, recording, etc.) device trust policies to facilitate the vetting of user devices used to perform interactions over content objects (e.g., step 214 of FIG. 2) are disclosed as follows.

Figure 4:
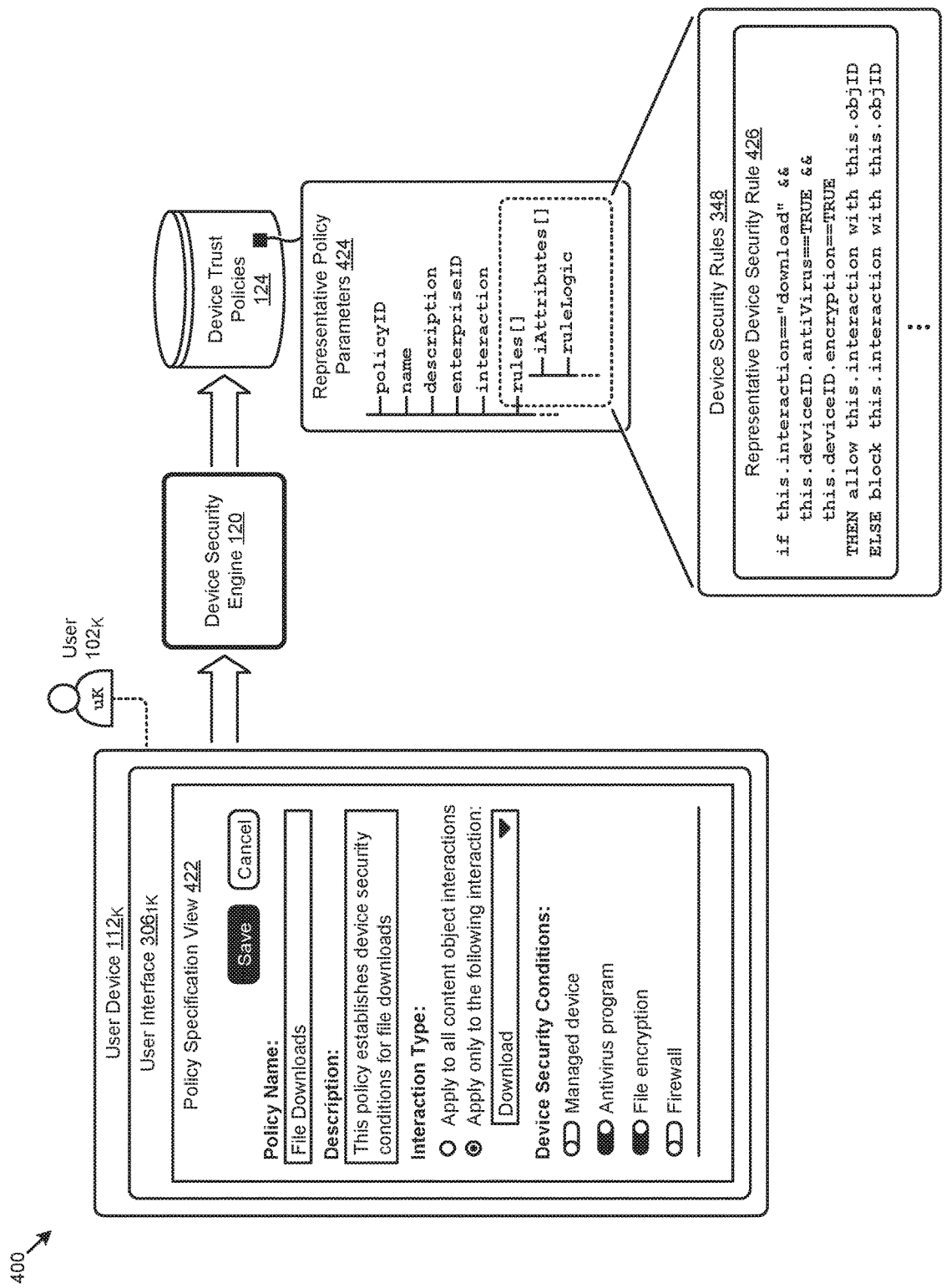
FIG. 4 depicts a device trust policy recording technique as implemented in systems that facilitate dynamic vetting of user devices to avoid security vulnerabilities when accessing shared content objects, according to an embodiment.

FIG. 4 depicts a device trust policy recording technique 400 as implemented in systems that facilitate dynamic vetting of user devices to avoid security vulnerabilities when accessing shared content objects. As an option, one or more variations of device trust policy recording technique 400 or any aspect thereof may be implemented in the context of the architecture and functionality of the embodiments described herein. The device trust policy recording technique 400 or any aspect thereof may be implemented in any environment.

FIG. 4 illustrates aspects pertaining to analyzing the attributes of shared content object interactions invoked by unvetted user devices to determine which security conditions must be present before performing the requested interactions over the shared content object. Specifically, the figure is presented to illustrate one embodiment of a user interface and data structure for specifying and recording policy parameters of instances of device trust policies. The flow depicted in the figure can represent an embodiment of step 214 of FIG. 2.

The device trust policy recording technique 400 is facilitated at least in part by a policy specification view 422 presented at a user interface $306_{1K}$ of user device $112_K$ associated with a user $102_K$. User $102_K$ might be a system administrator of an enterprise who is responsible for establishing at least some of the device trust policies for the enterprise. To assist such system administrators, a content management system might provide the policy specification view 422 or other views to collect the user inputs that specify the policy parameters of the device trust policies.

Specifically, policy specification view 422 comprises user interface elements (e.g., text boxes, radio buttons, dropdown selection lists, switches, checkboxes, etc.) to collect such user inputs. As can be observed, user $102_K$ can manipulate the user interface elements to specify a policy name (e.g., entered in a "Policy Name" text box), a policy description (e.g., entered in a "Description" text box), an interaction type associated with the policy (e.g., enabled by a radio button and selected in a dropdown in a "Interaction Type" section), one or more device security conditions associated with the policy (e.g., as selected in a "Device Security Conditions" section), and/or other policy attributes. An interaction type, as used herein, is a data object that is used to associate certain device trust policies with respective interactions to be performed over content objects. As can be observed in policy specification view 422, for example, an interaction type defined by the text string "Download" is associated with the "File Downloads" policy. As such, any "Download" interactions with content objects will be governed by the "File Downloads" policy. In some cases, multiple interaction types might be associated with a particular device trust policy.

When user $102_K$ clicks the "Save" button in policy specification view 422, the user inputs from the view are submitted to device security engine 120. After certain policy conflict remediation operations are performed as earlier described, the policy parameters associated with the "File Downloads" policy are recorded in device trust policies 124. As depicted in a set of representative policy parameters 424, each policy in device trust policies 124 might be described by a policy identifier (e.g., stored in a "policyID" field), a policy name (e.g., stored in a "name" field), a policy description (e.g., stored in a "description" field), an enterprise identifier (e.g., stored in an "enterprise ID" field), an interaction type (e.g., stored in an "interaction" field), one or more device security rules (e.g., stored in a "rules[ ]" object), and/or other parameters. As facilitated by the foregoing representative policy parameters, a particular device trust policy can be uniquely selected for a subject interaction event using the interaction type (e.g., as specified in the "interaction" field) and enterprise identifier (e.g., as specified in the "enterprise ID" field) that corresponds to the subject interaction event.

A set of rules (e.g., rule base), such as the device security rules 348 stored in the "rules[ ]" object or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or conditional logic operators (e.g., "if", "then", "and", "or", "greater than", "less than", etc.) for forming a conditional logic statement that returns one or more results. In some cases, the information pertaining to a rule might comprise the conditions (e.g., predicates, conditional expressions, field names, field values, etc.) and commands and clauses (e.g., "select", "where", "order by", etc.) for forming a data statement (e.g., query) that returns one or more results. As shown in representative policy parameters 424, the aforementioned conditional logic operands may comprise various interaction attributes (e.g., stored in an "iAttributes[ ]" object), and the aforementioned conditional logic operators may be incorporated into one or more conditional logic statements (e.g., codified in instances of "ruleLogic" fields) that have placeholders for the interaction attributes.

One example of such rules is depicted in a representative device security rule 426. The representative device security rule 426 is formed by device security engine 120 in response to the selection of at least some "Device Security Conditions" in policy specification view 422. More specifically, the shown user inputs of policy specification view 422 indicate that any user devices that "Download" content objects are to have antivirus and file encryption capabilities. In response to these device security conditions as specified in policy specification view 422, the representative device security rule 426 is formed and recorded in device trust policies 124.

The rule specifically states that if the interaction associated with a subject interaction event is a download (e.g., "this.interaction=="download""), and the user device satisfies the conditions of having an antivirus capability (e.g., "this.deviceID.antivirus==TRUE") and the user device satisfies the conditions of having a file encryption capability (e.g., "this.deviceID.encryption==TRUE"), then the download is allowed. If the antivirus or encryption conditions are not satisfied, the download is blocked. As depicted in policy specification view 422, other device security conditions might pertain to whether or not the user device is a managed device or has an operational firewall capability (e.g., on the user device or in the user device environment).

The foregoing discussions include techniques for recording the interaction attributes associated with interaction events invoked from user devices (e.g., step 222 of FIG. 2), which techniques are disclosed in further detail as follows.

Figure 5:
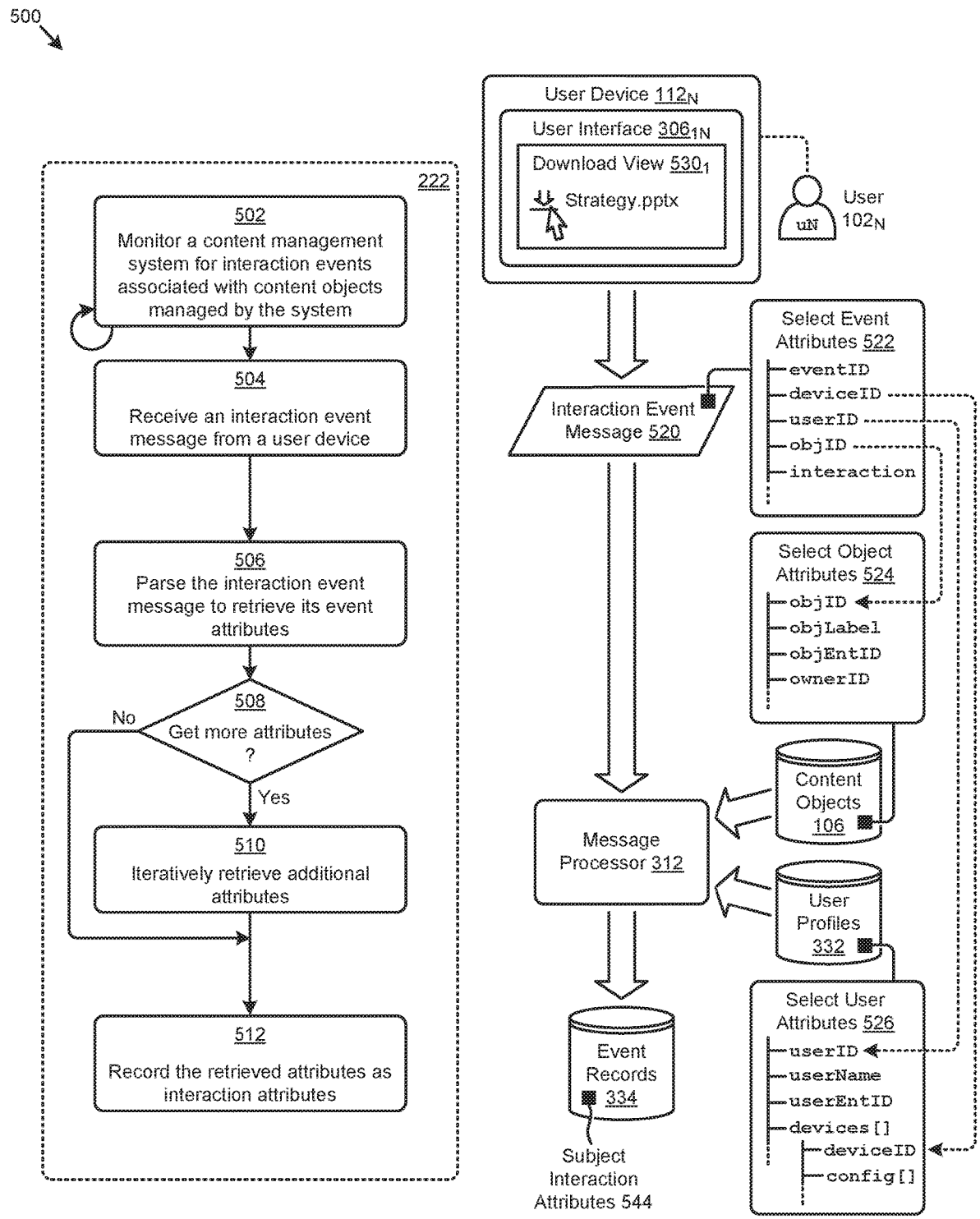
FIG. 5 depicts an interaction event recording technique as implemented in systems that facilitate dynamic vetting of user devices to avoid security vulnerabilities when accessing shared content objects, according to an embodiment.

FIG. 5 depicts an interaction event recording technique 500 as implemented in systems that facilitate dynamic vetting of user devices to avoid security vulnerabilities when accessing shared content objects. As an option, one or more variations of interaction event recording technique 500 or any aspect thereof may be implemented in the context of the architecture and functionality of the embodiments described herein. The interaction event recording technique 500 or any aspect thereof may be implemented in any environment.

FIG. 5 illustrates aspects pertaining to analyzing the attributes of shared content object interactions invoked by unvetted user devices to determine which security conditions must be present before performing the requested interactions over the shared content object. Specifically, the figure is presented to illustrate one embodiment of certain steps and/or operations that facilitate identifying interaction events and determining the interaction attributes associated with those events. As depicted in the figure, the steps and/or operations are associated with step 222 of FIG. 2. A representative scenario is also shown in the figure to illustrate an example application of interaction event recording technique 500.

The interaction event recording technique 500 commences by monitoring a content management system for interaction events associated with content objects managed by the system (step 502). As illustrated, one or more instances of message processor 312 might monitor all interaction events invoked by the users of the content management system. In response to any one of the interaction events invoked from a user device, an interaction event message is received (step 504). Referring to the scenario of FIG. 5, consider an interaction event message that pertains to user $102_N$ clicking on a download icon in a download view $530_1$ to download a file named "Strategy.pptx". As shown, the download view $530_1$ might be presented in a user interface $306_{1N}$ of user device $112_N$. In response to the foregoing user action, an interaction event message 520 is received at message processor 312.

The interaction event message is parsed to retrieve the event attributes of the interaction event (step 506). As indicated in a set of select event attributes 522, interaction event message 520 might be characterized by attributes that describe an event identifier (e.g., stored in an "eventID" field), a device identifier associated with the user device (e.g., stored in a "deviceID" field), a user identifier (e.g., stored in a "userID" field), a content object identifier (e.g., stored in an "objID" field), an interaction type (e.g., stored in an "interaction" field), and/or other attributes. If more attributes are required to characterize the interaction event ("Yes" path of decision 508), then various other attributes derived from the event attributes are retrieved (step 510). As shown, certain content object attributes (e.g., content object metadata) might be retrieved from content objects 106 using the content object identifier (e.g., "objID" attribute) from interaction event message 520 and/or certain user attributes might be retrieved from user profiles 332 using the user identifier (e.g., "userID" attribute) from interaction event message 520.

As depicted in a set of select object attributes 524, the retrieved object attributes might include a classification label assigned to the content object (e.g., stored in an "objLabel" field), an enterprise identifier associated with the content object (e.g., stored in an "objEntID" field), a content object owner identifier (e.g., stored in an "owner ID" field), and/or other object attributes. As depicted in a set of select user attributes 526, the retrieved user attributes might include a user name (e.g., stored in a "userName" field), an enterprise identifier associated with the user (e.g., stored in a "userEntID" field), information pertaining to one or more known user devices associated with the user (e.g., stored in a "devices[ ]" object), and/or other user attributes.

As shown, each known user device associated with a particular user can be represented by a device identifier (e.g., stored in a "deviceID" field), a set of user device configuration information (e.g., stored in a "config[ ]" object), and/or other user device attributes. Such recorded user device information can be used to determine if a user device associated with an interaction event (e.g., identified by a "deviceID" interaction attribute) is a known user device that is associated with the user associated with the interaction event (e.g., identified by a "userID" interaction attribute). As later described, any recorded user device information from user profiles 332 that pertains to a user device associated with an interaction event may be used to facilitate the herein disclosed techniques. If a device identifier of a particular user device is not found in user profiles 332, the user device is considered "unknown" to the content management system.

When all desired attributes associated with an interaction event are retrieved (e.g., "No" path of decision 508 or completion of step 510), then the retrieved attributes are recorded as a set of interaction attributes that characterize the interaction event (step 512). As depicted in the scenario of FIG. 5, message processor 312 can record a set of subject interaction attributes 544 associated with interaction event message 520 in event records 334. In this case, subject interaction attributes 544 characterize the download request from user $102_N$ at his or her user device.

The foregoing discussions include techniques for applying the interaction attributes of interaction events to device trust policies to determine sets of device security conditions to vet the security capabilities of the user devices associated with the interaction events (e.g., step 224 of FIG. 2), which techniques are disclosed in further detail as follows.

Figure 6:
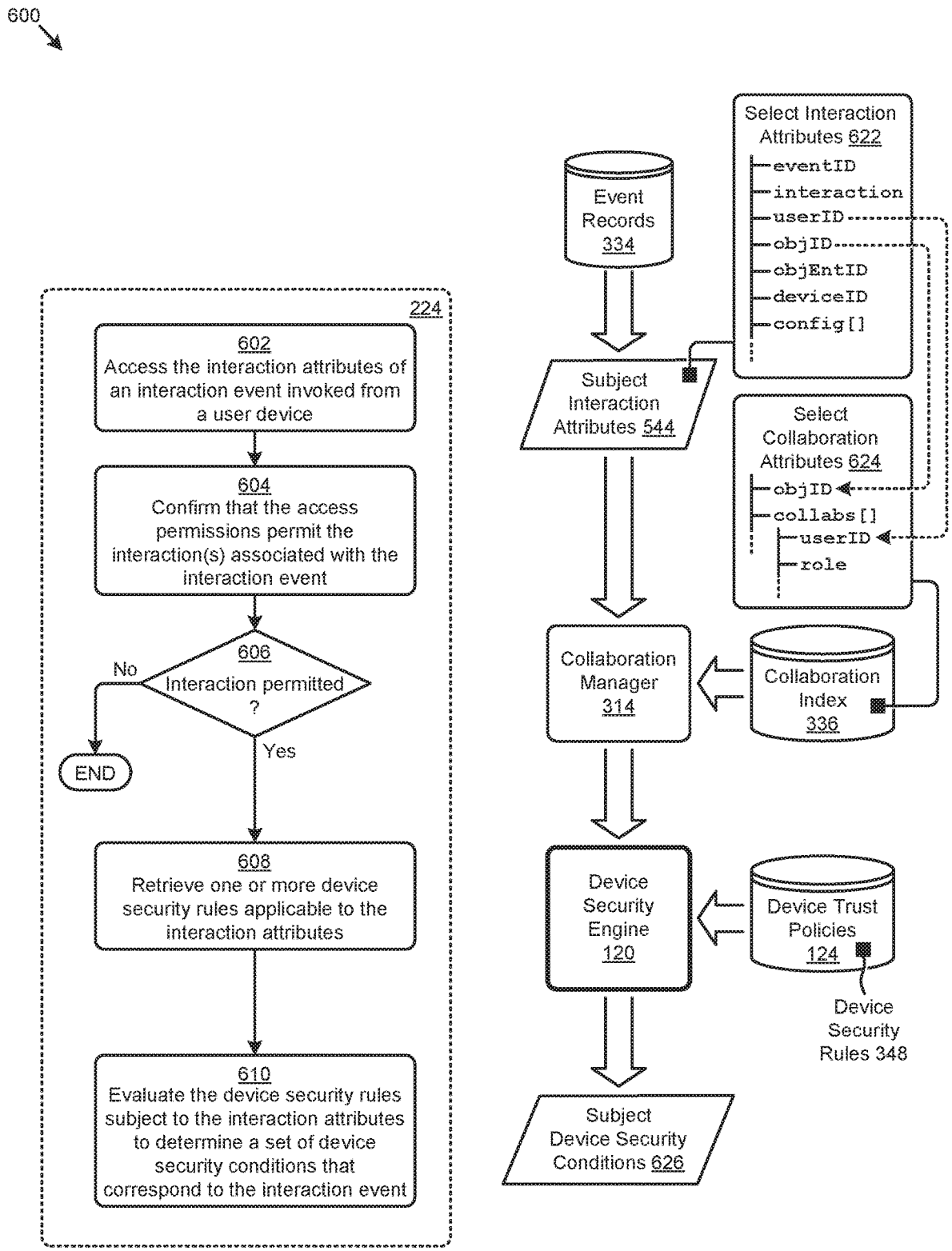
FIG. 6 depicts a rule-based device security conditions determination technique as implemented in systems that facilitate dynamic vetting of user devices to avoid security vulnerabilities when accessing shared content objects, according to an embodiment.

FIG. 6 depicts a rule-based device security conditions determination technique 600 as implemented in systems that facilitate dynamic vetting of user devices to avoid security vulnerabilities when accessing shared content objects. As an option, one or more variations of rule-based device security conditions determination technique 600 or any aspect thereof may be implemented in the context of the architecture and functionality of the embodiments described herein. The rule-based device security conditions determination technique 600 or any aspect thereof may be implemented in any environment.

FIG. 6 illustrates aspects pertaining to analyzing the attributes of shared content object interactions invoked by unvetted user devices to determine which security conditions must be present before performing the requested interactions over the shared content object. Specifically, the figure is presented to illustrate one embodiment of certain steps and/or operations that facilitate applying the interaction attributes of interaction events to device trust policies to determine sets of device security conditions. As depicted in the figure, the steps and/or operations are associated with step 224 of FIG. 2. A representative scenario is also shown in the figure to illustrate an example application of rule-based device security conditions determination technique 600.

The rule-based device security conditions determination technique 600 commences by accessing the interaction attributes of an interaction event invoked from a user device (step 602). Continuing the scenario depicted in FIG. 5, the subject interaction attributes 544 earlier described are accessed at the event records 334 of a content management system. As indicated in a set of select interaction attributes 622, subject interaction attributes 544 might describe an event identifier (e.g., stored in an "eventID" field), an interaction type (e.g., stored in an "interaction" field), a user identifier (e.g., stored in a "userID" field), a content object identifier (e.g., stored in an "objID" field), an owner affiliation associated with the content object (e.g., stored in an "objEntID" field), a device identifier of the user device (e.g., stored in a "deviceID" field), any configuration information associated with the user device (e.g., stored in a "config[ ]" object), and/or other attributes.

The access permissions associated with the interaction event are checked to confirm that any interactions associated with the interaction event are permitted (step 604). For example, if an interaction event pertains to a download request, the access permissions will be checked to confirm that a download is permissible. As can be observed, an instance of collaboration manager 314 might access a collaboration index 336 to determine if an interaction as described by the "interaction" attribute of subject interaction attributes 544 is permissible. As indicated by the shown select collaboration attributes 624, collaboration index 336 contains information that pertains to the collaborative relationships (e.g., stored in instances of a "collabs[ ]" object) associated with particular content objects (e.g., identified by an object identifier stored in an "objID" field).

As shown, each collaborative relationship associated with a particular content object identifies a user (e.g., stored in a "userID" filed), a role of the user in the relationship (e.g., stored in a "role" field), and/or other attributes. Multiple collaborative relationships (e.g., multiple users with respective roles) for a particular content object are possible. For the interaction event described by subject interaction attributes 544, collaboration manager 314 might scan the collaborative relationships (e.g., stored in instances of a "collabs[ ]" object) of the subject content object (e.g., identified by the "objID" attribute) to confirm that the subject user (e.g., identified by the "userID" attribute) has a relationship with the subject content object and a role that permits the subject interaction (e.g., identified by the "interaction" attribute).

If an interaction associated with the interaction event is not permitted according to the access permissions ("No" path of decision 606), no further operations are performed. If the interaction is permitted according to the access permissions ("Yes" path of decision 606), then one or more device security rules applicable to the interaction attributes are retrieved (step 608). For example, an instance of device security engine 120 implemented at the content management system might access a store of device trust policies 124 to retrieve a policy that is applicable to the interaction event described by the subject interaction attributes 544. In some cases, an applicable device trust policy from device trust policies 124 is identified based at least in part on the interaction type (e.g., the "interaction" attribute of subject interaction attributes 544) and the enterprise identifier associated with the content object (e.g., the "objEntID" attribute of subject interaction attributes 544).

As earlier described, such device trust policies often comprise certain respective instances of device security rules 348. As such, the applicable set of device security rules associated with the identified device trust policy is evaluated subject to some or all of the interaction attributes to determine a set of device security conditions that correspond to the interaction event (step 610). In this case, the device security conditions are the outcomes of the logical statements that comprise the rules as evaluated in accordance with the interaction attributes. Specifically, a set of subject device security conditions 626 describe the conditions the user device (e.g., identified by the "deviceID" attribute) is to satisfy to perform the subject interaction (e.g., identified by the "interaction" attribute) that corresponds to the interaction event associated with subject interaction attributes 544.

The foregoing discussions include techniques for issuing responses to the interaction events in accordance with the device security conditions identified for the events (e.g., step 226 of FIG. 2), which techniques are disclosed in further detail as follows.

Figure 7A:
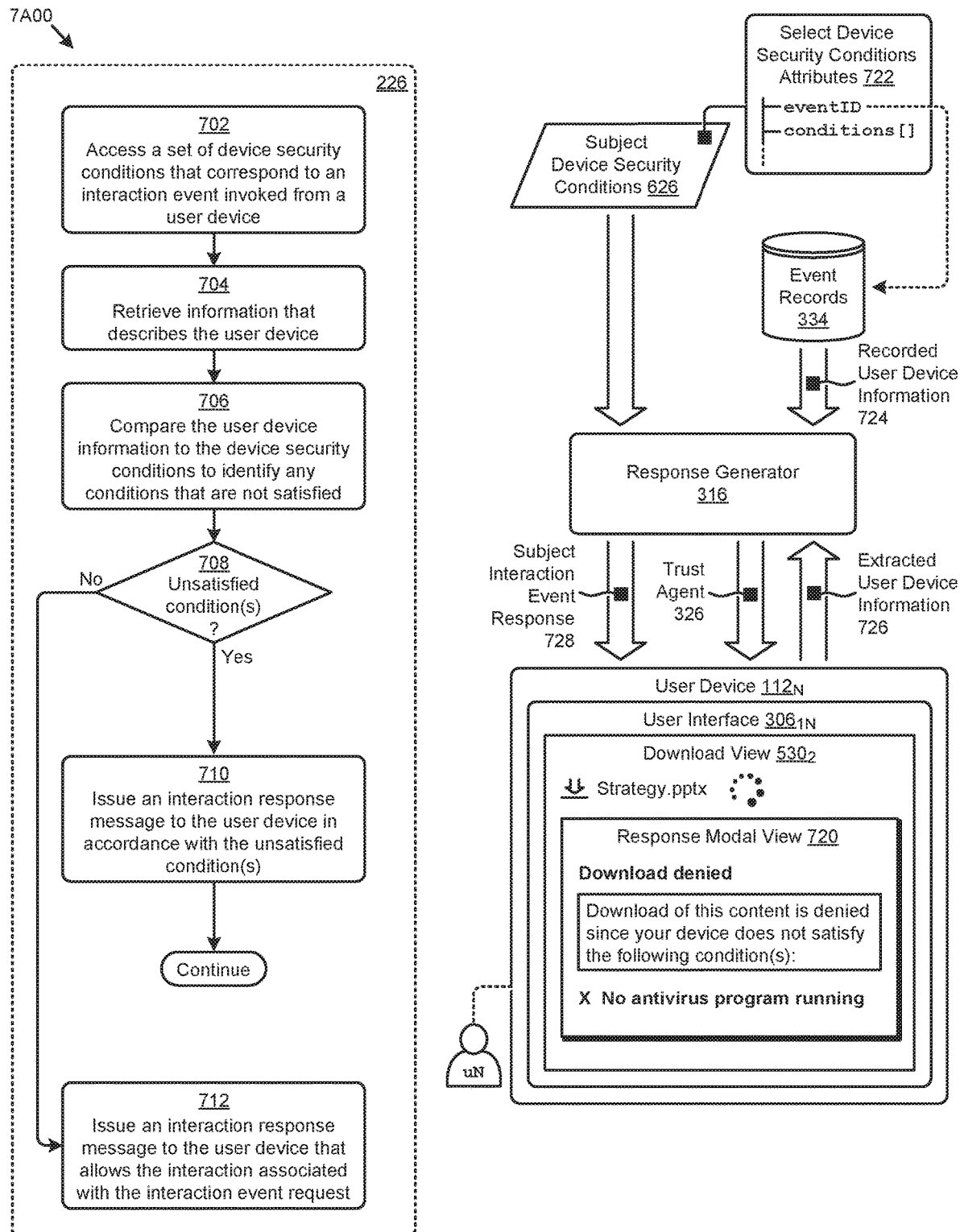
FIG. 7A depicts an interaction event response technique as implemented in systems that facilitate dynamic vetting of user devices to avoid security vulnerabilities when accessing shared content objects, according to an embodiment.

FIG. 7A depicts an interaction event response technique 7A00 as implemented in systems that facilitate dynamic vetting of user devices to avoid security vulnerabilities when accessing shared content objects. As an option, one or more variations of interaction event response technique 7A00 or any aspect thereof may be implemented in the context of the architecture and functionality of the embodiments described herein. The interaction event response technique 7A00 or any aspect thereof may be implemented in any environment.

FIG. 7A illustrates aspects pertaining to analyzing the attributes of shared content object interactions invoked by unvetted user devices to determine which security conditions must be present before performing the requested interactions over the shared content object. Specifically, the figure is presented to illustrate one embodiment of certain steps and/or operations that facilitate issuing responses to the interaction events in accordance with the device security conditions identified for the events. As depicted in the figure, the steps and/or operations are associated with step 226 of FIG. 2. A representative scenario is also shown in the figure to illustrate an example application of interaction event response technique 7A00.

The interaction event response technique 7A00 commences by accessing a set of device security conditions that correspond to an interaction event invoked from a user device (step 702). Continuing the scenario depicted in FIG. 5 and FIG. 6, the subject device security conditions 626 earlier described are accessed by an instance of a response generator 316 at a content management system. As indicated in a set of select device security conditions attributes 722, subject device security conditions 626 might describe an event identifier corresponding to the interaction event response (e.g., stored in an "eventID" field), a list of conditions for the user device associated with the interaction event response (e.g., stored in a "conditions[ ]" object), and/or other attributes that characterize the device security conditions.

To facilitate generation of an interaction event response, certain information pertaining to the user device is retrieved (step 704). As can be observed, response generator 316 might access the event records 334 to retrieve instances of recorded user device information 724 associated with the user device associated with the interaction event response (e.g., identified by the "eventID" attribute). Such recorded user device information might comprise device configuration information collected in response to interactions earlier performed at the user device. Response generator 316 may send one or more trust agents 326 to user device $112_N$ to perform certain operations at the device (e.g., to retrieve a set of extracted user device information 726). As one specific example, a trust agent might be implemented as a plug-in that is configured for loading onto user device $112_N$ to discover certain information about the device. As another example, a downloaded trust agent might comprise instructions and executable code to scan the user device $112_N$ to determine of the capabilities of the user device satisfy the subject device security conditions 626. In this case, extracted user device information 726 might comprise logical indicators (e.g., "TRUE" or "FALSE") that characterize whether or not the user device satisfies a corresponding condition.

The retrieved user device information is compared to the device security conditions to identify any conditions that are not satisfied (step 706). If there are no unsatisfied conditions ("No" path of decision 708), then an interaction event response message is issued to the user device that indicates that the interaction associated with the interaction event response is allowed (step 712). The interaction event response might merely invoke the requested interaction (e.g., upload, download, etc.) with no human interaction by a user. If there are one or more unsatisfied conditions ("Yes" path of decision 708), then an interaction event response message is issued to the user device in accordance with the unsatisfied conditions (step 710), and processing continues on the user device.

For example, in cases when there are one or more unsatisfied conditions, an interaction event response message might serve to block the interaction associated with the interaction request and might also provide a reason for blocking the interaction. As depicted in the scenario of FIG. 7A, a subject interaction event response 728 is issued from response generator 316 to a download view $530_2$ presented in user interface $306_{1N}$ of user device $112_N$. The information contained in subject interaction event response 728 is accessed to populate a response modal view 720 in download view $530_2$. As can be observed, the response modal presents the outcome "Download denied" and a reason for the outcome (e.g., "No antivirus program running").

The foregoing discussions include representative scenarios to illustrate example applications of the herein disclosed techniques. Another representative scenario is disclosed as follows.

Figure 7B:
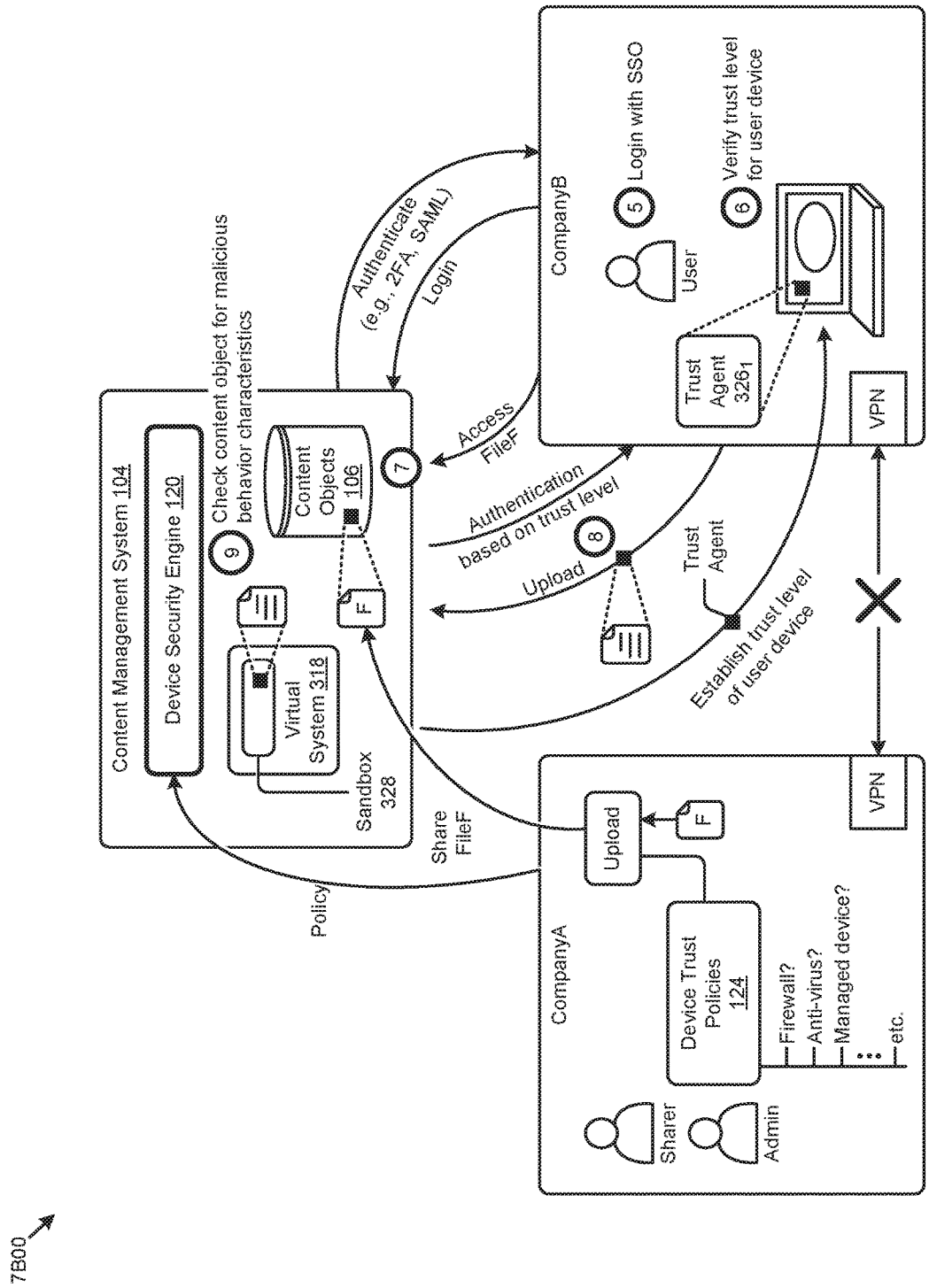
FIG. 7B presents an inter-enterprise use scenario as facilitated by various components of a secure collaboration system that supports dynamic vetting of user devices to avoid security vulnerabilities when accessing shared content objects, according to an embodiment.

FIG. 7B presents an inter-enterprise use scenario 7B00 as facilitated by various components of a secure collaboration system that supports dynamic vetting of user devices to avoid security vulnerabilities when accessing shared content objects. As an option, one or more variations of inter-enterprise use scenario 7B00 or any aspect thereof may be implemented in the context of the architecture and functionality of the embodiments described herein. The inter-enterprise use scenario 7B00 or any aspect thereof may be implemented in any environment.

FIG. 7B illustrates aspects pertaining to analyzing the attributes of shared content object interactions invoked by unvetted user devices to determine which security conditions must be present before performing the requested interactions over the shared content object. Specifically, the figure is being presented with respect to its contribution to addressing the problem of controlling access to, and handling of, shared objects over multiple user devices in an inter-enterprise use scenario.

In the depiction of FIG. 7B, a user in "CompanyA" uploads a policy to an instance of a device security engine 120 (e.g., security policy engine) of a content management system 104 (e.g., a collaboration system). Thereafter a user uploads a file file "F" to content objects 106 (e.g., stored in cloud storage) for sharing with a group of collaborators in "CompanyB". In order to access the shared file "F", a user in CompanyB logs into content management system 104. In the shown example, the user accomplished such a login using a single-sign-on (SSO) protocol (operation 5). The device security engine 120 will apply policies to the logging-in user, possibly including one or more policies from device trust policies 124 that were earlier uploaded by CompanyA. The applied policies might include enforcement of two-factor authentication (e.g., 2FA with SAML), and/or the applied policies might include verifying a trust level (operation 6) as pertains to the specific user device that the user at CompanyB is using. Such a trust level or degree of trust might be derived based on a set of device security conditions that are satisfied by the user device and/or that are satisfied by conditions of the network over which the user device communicates. In some cases, and as shown, a trust agent (e.g., trust agent $326_1$) is downloaded to the user device of the user, and that downloaded trust agent serves to verify a trust level associated with the user device.

Assuming the user is authenticated or otherwise verified, the trust agent can be used to vet the device and establish a trust level for the user device, which trust level is then used for ongoing operations. In some cases, different trust levels are determined for each different type of interaction with the content management system 104. In some cases, a trust level is dependent on the location of the user device.

Assuming that the user is authenticated and assuming that the user device is sufficiently trusted, certain actions are deemed to be authorized. Such actions might be specific to an action type and/or a specific content object type and or might be specific to certain content of the particular content object.

Strictly as one example, a user might be authorized to access a shared file (operation 7) and/or might be authorized to upload a content object to content management system (operation 8), which in turn might be shared with employees of CompanyA. However, before allowing such sharing, the uploaded content object is vetted. In one specific case of vetting, an executable object is "sandboxed" in a safe area (e.g., sandbox 328 of virtual system 318) such that the content object can be checked for malware or other malicious behavior characteristics (operation 9). If the check of the content object passes, it can be shared. Of course, passing the sandbox vetting might be dependent, at least in part on the policy or policies (e.g., from device trust policies 124) that had been defined by CompanyA. Such policies can place security requirements or conditions on interactions by anyone or any process in CompanyB. For example, a policy defined by CompanyA might require that CompanyB carry out interactions with content management system 104 through a firewall installed at CompanyB. Or, a policy defined by CompanyA might require that CompanyB have antivirus detection capability installed at CompanyB sites.

As can now be appreciated, secure policies can be enforced even in absence of a virtual private network (VPN). This is shown by the large "X" between CompanyA and CompanyB.

Additional Embodiments of the Disclosure

Additional Practical Application Examples

Figure 8A:
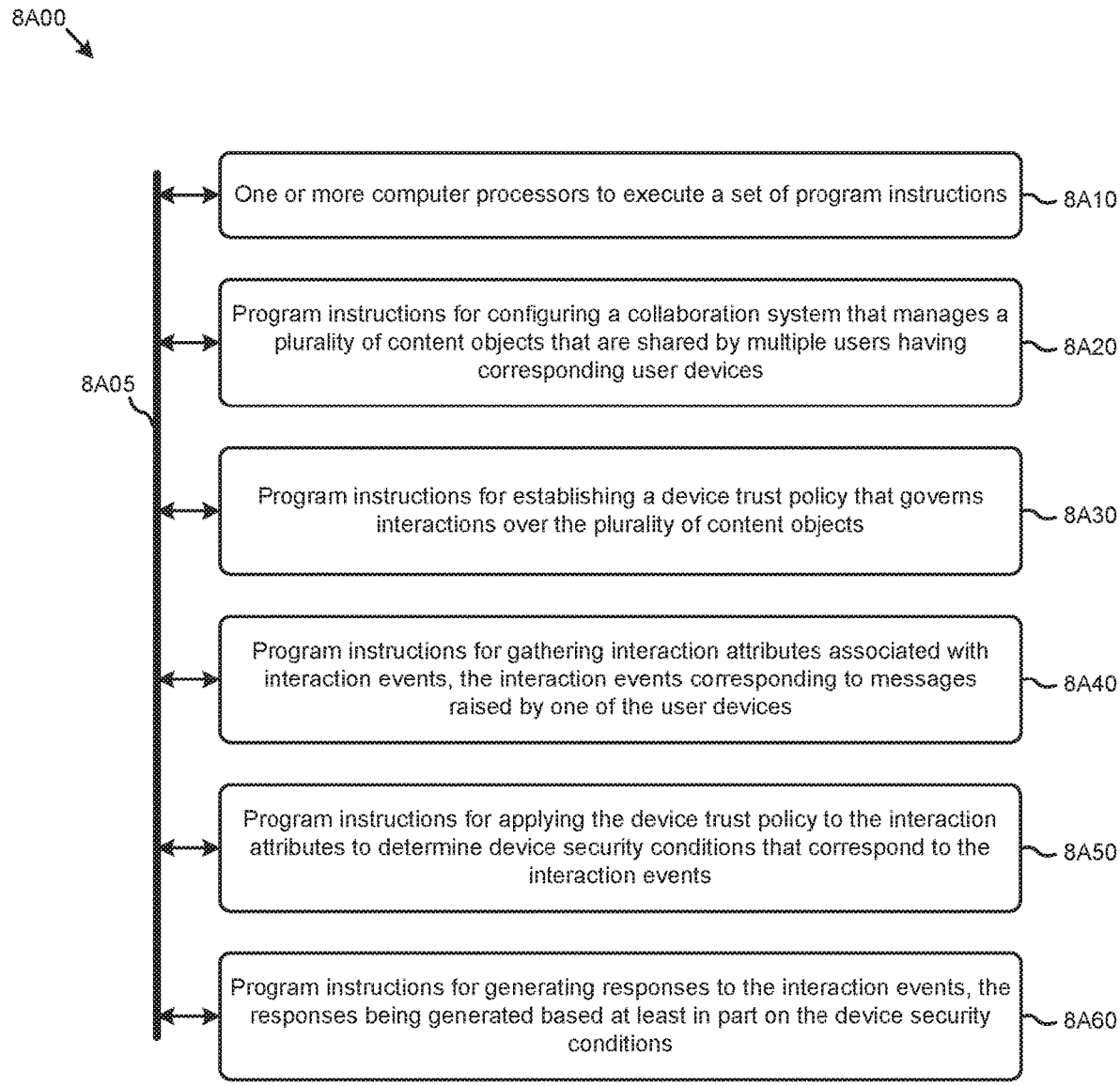
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address assessing leakage and other security risks presented by unknown user devices. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions for configuring a collaboration system that manages a plurality of content objects that are shared by multiple users at corresponding user devices (module 8A20). The program code also includes instructions to perform certain specific operations such as: establishing a device trust policy that governs interactions over the plurality of content objects (module 8A30); gathering interaction attributes associated with interaction events, the interaction events corresponding to messages raised by one of the user devices (module 8A40); applying the device trust policy to the interaction attributes to determine device security conditions that correspond to the interaction events (module 8A50); and generating responses to the interaction events, the responses being generated based at least in part on the device security conditions (module 8A60).

Variations of the foregoing may include more or fewer of the shown modules. Certain variations may perform more or fewer (or different) steps and/or certain variations may use data elements in more, or in fewer, or in different operations. Strictly as examples, variations in embodiments may include operations for comparing user device information to the device security conditions to identify one or more unsatisfied conditions (e.g., where the responses are generated based on the unsatisfied conditions). In some cases, the user device information is retrieved from a data store of the collaboration system, in other cases the user device information is retrieved from a user device. In some situations, retrieval of device information from a user device relies in a trust agent that is delivered to the user device. The trust agent runs on the user device and is configured to retrieve the user device information on demand from the collaboration system.

In some embodiments, the aforementioned device trust policy includes one or more device security rules that are evaluated based on interaction attributes. Under some conditions, which conditions are operands used in evaluation of the device security rules, the requested interaction or interactions are conditionally permitted, whereas under different conditions, the interaction or interactions are blocked. It is possible that conditions that correspond to blocked interactions can be remediated by installing an antivirus program, and/or by enabling a file encryption capability, and/or by enabling a firewall capability. In some cases, the conditions are determined as a result of an analysis within a sandbox or other type of virtual system.

Still further, some embodiments include variations in the operations performed, and some embodiments include variations of aspects of the data elements used in the operations.

Figure 8B:
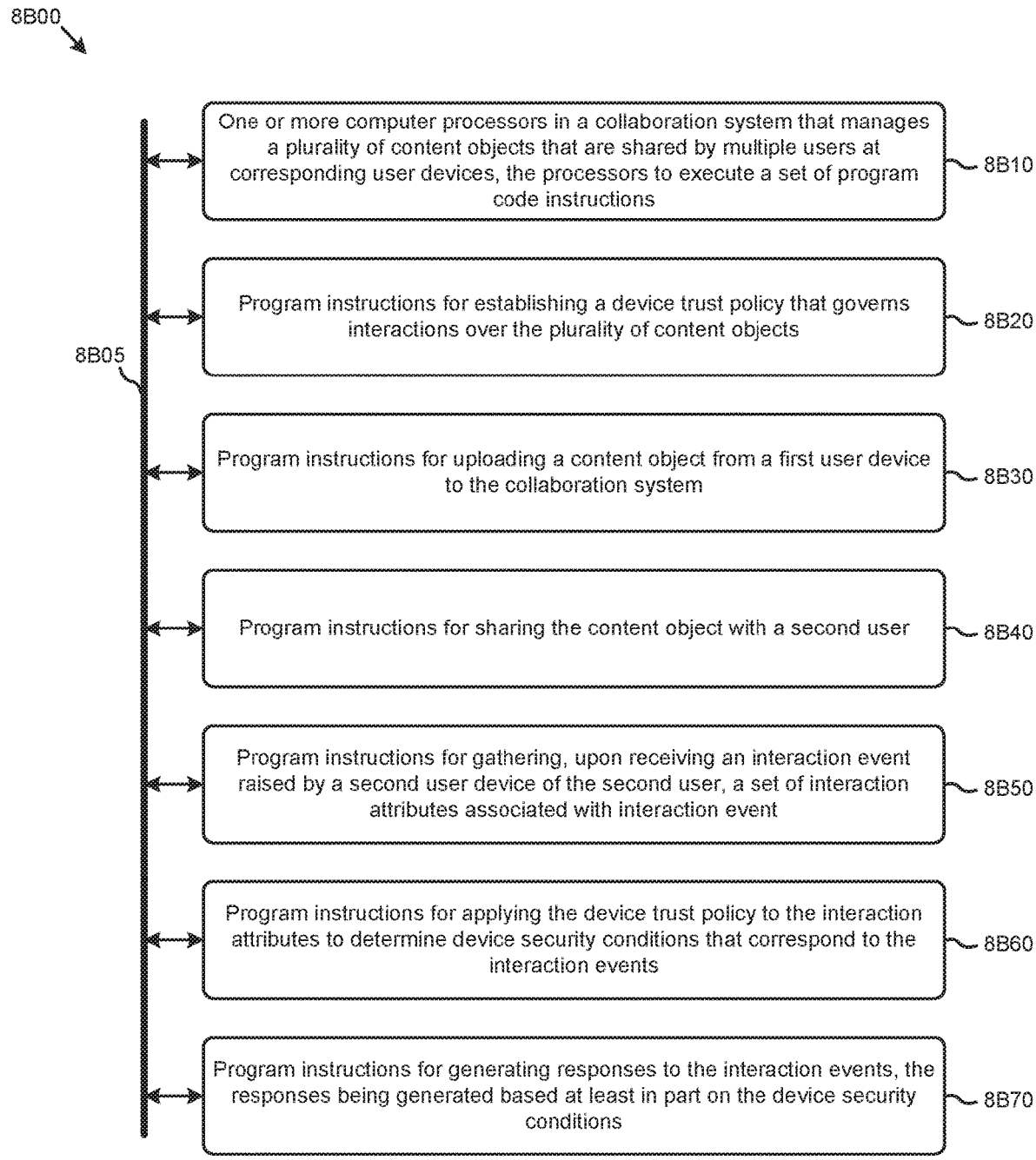

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors in a collaboration system that manages a plurality of content objects that are shared by multiple users at corresponding user devices, the processors to execute a set of program code instructions (module 8B10) and modules for accessing memory to hold program code instructions to perform: establishing a device trust policy that governs interactions over the plurality of content objects (module 8B20); uploading a content object from a first user device to the collaboration system, wherein the collaboration system receives the uploaded content object (module 8B30); sharing the content object with a second user (module 8B40); gathering, upon receiving an interaction event raised by a second user device of the second user, a set of interaction attributes associated with interaction event (module 8B50); applying the device trust policy to the interaction attributes to determine device security conditions that correspond to the interaction events (module 8B60); and generating responses to the interaction events, the responses being generated based at least in part on the device security conditions (module 8B70).

System Architecture Overview

Additional System Architecture Examples

Figure 9A:
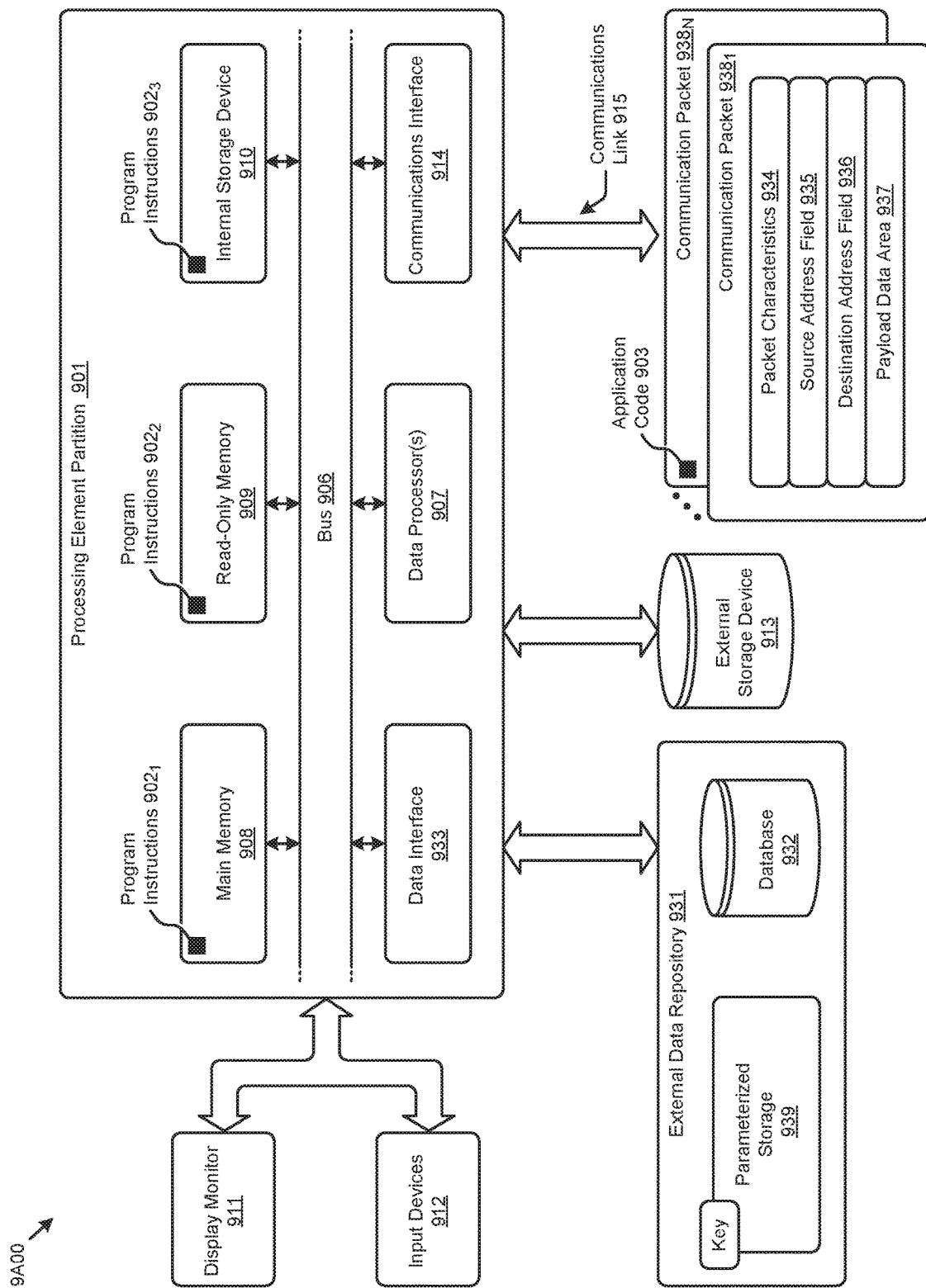
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program instructions may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to dynamically vetting user devices to avoid security vulnerabilities. A module may include one or more state machines and/or combinational logic used to implement or facilitate the operational and/or performance characteristics pertaining to dynamically vetting user devices to avoid security vulnerabilities.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamically vetting user devices to avoid security vulnerabilities). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to dynamically vetting user devices to avoid security vulnerabilities, and/or for improving the way data is manipulated when performing computerized operations pertaining to analyzing the attributes of shared content object interactions invoked by unvetted user devices to determine which security conditions must be present before performing the requested interactions over the shared content object.

Figure 9B:
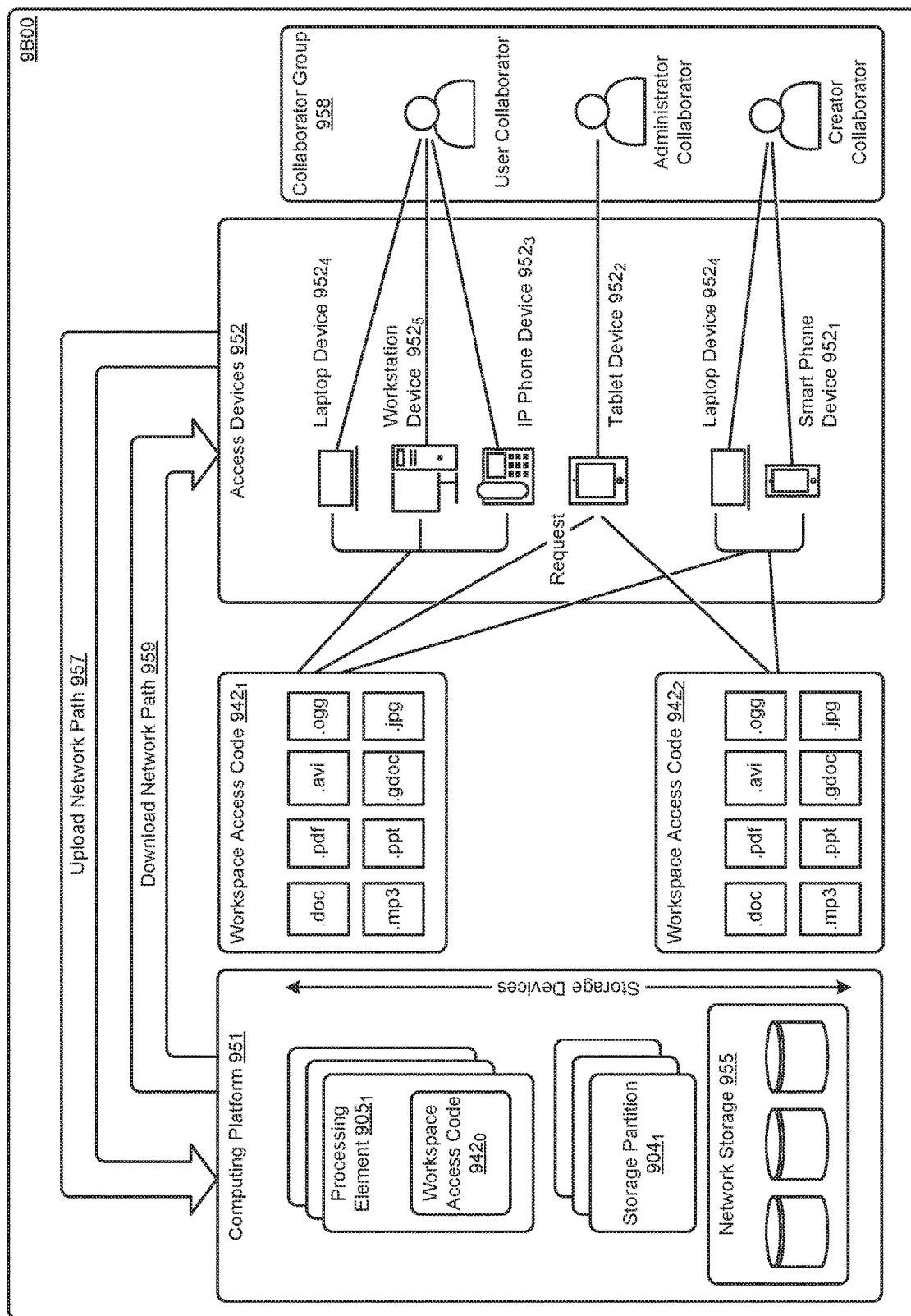

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for performing policy-based user device security checks, the method comprising:

establishing a trust policy that governs interactions over a plurality of content objects in a collaboration system, wherein the trust policy manages sharing of a content object from the plurality of content objects that is uploaded by a first user from a first user device with a second user at a second user device, the trust policy defining a security condition with regard to the content object uploaded by the first user at the first user device for access by the second user at the second user device based at least in part on characteristics of the second user device, and the trust policy is directed to interactions for multiple types of devices comprising at least a first type of device and a second type of device, wherein the first type of device comprises managed devices and the second type of device comprises unmanaged devices, wherein a managed device is a user device of managed users of an enterprise entity who are characterized by at least a set of attributes stored in a set of user profiles and use their respective user devices to collaborate over the content objects in a content management system within the enterprise entity and is preauthorized to access the content object and an unmanaged device is not preauthorized to access the content object having users external to the enterprise entity that are not managed users of the content management system;

receiving the content object from the first user device, the content object being uploaded to the collaboration system;

configuring access permissions to allow sharing of the content object with the second user;

gathering, upon receiving an interaction event raised by the second user device of the second user, a set of interaction attributes associated with the interaction event;

applying the trust policy to the set of interaction attributes to determine access permission to the content object by:

granting access permission, when the second user device of the second user is a managed device, to the content object uploaded by the first user of the first user device, and determining, when the second user device of the second user is an unmanaged device, whether an applicable security condition that correspond to the interaction events is met for permitting access by the second user at the second user device to the content object that was uploaded by the first user at the first user device, wherein permission for access is based at least upon the characteristics of the second user device; and generating responses to the interaction events, the responses being generated based at least in part on the applicable security conditions.

2. The method of claim 1, wherein the first user device is associated with the first user in a first enterprise, and wherein the second user device is associated with second enterprise that is different from the first enterprise.

3. The method of claim 1, further comprising:
comparing user device information to the security conditions to identify one or more unsatisfied conditions, wherein the responses are generated based at least in part on the unsatisfied conditions.

4. The method of claim 3, wherein the user device information is retrieved from at least one of, a data store, or from a user device.

5. The method of claim 4, wherein an instance of a trust agent is delivered to the user device to retrieve the user device information.

6. The method of claim 1, wherein the trust policy comprises one or more device security rules.

7. The method of claim 6, wherein the one or more device security rules are evaluated based on at least one interaction attribute from the set of interaction attributes.

8. The method of claim 1, wherein at least one of the responses to the second user device indicates that at least one of the interactions is allowed, or that at least one of the interactions is blocked.

9. The method of claim 1, wherein the security conditions pertain to at least one of, an installed antivirus program, a file encryption capability, a firewall capability, or an analysis within a virtual system.

10. The method of claim 1, wherein the security conditions correspond to one or more trust levels.

11. A non-transitory computer readable medium having stored thereon a sequence of instructions which, when stored in memory and executed by one or more hardware processors causes the one or more hardware processors to perform a set of acts for performing policy-based user device security checks, the set of acts comprising:

establishing a trust policy that governs interactions over a plurality of content objects in a collaboration system, wherein the trust policy manages sharing of a content object from the plurality of content objects that is uploaded by a first user from a first user device with a second user at a second user device, the trust policy defining a security condition with regard to the content object uploaded by the first user at the first user device for access by the second user at the second user device based at least in part on characteristics of the second user device, and the trust policy is directed to interactions for multiple types of devices comprising at least a first type of device and a second type of device, wherein the first type of device comprises managed devices and the second type of device comprises unmanaged devices, wherein a managed device is a user device of managed users of an enterprise entity who are characterized by at least a set of attributes stored in a set of user profiles and use their respective user devices to collaborate over the content objects in a content management system within the enterprise entity and is preauthorized to access the content object and an unmanaged device is not preauthorized to access the content object having users external to the enterprise entity that are not managed users of the content management system;

receiving the content object from the first user device, the content object being uploaded to the collaboration system;

configuring access permissions to allow sharing of the content object with the second user;

gathering, upon receiving an interaction event raised by the second user device of the second user, a set of interaction attributes associated with the interaction event;

applying the trust policy to the set of interaction attributes to determine access permission to the content object by:

granting access permission, when the second user device of the second user is a managed device, to the content object uploaded by the first user of the first user device, and determining, when the second user device of the second user is an unmanaged device, whether an applicable security conditions that correspond to the interaction events is met for permitting access by the second user at the second user device to the content object that was uploaded by the first user at the first user device, wherein permission for access is based at least upon the characteristics of the second user device; and generating responses to the interaction events, the responses being generated based at least in part on the security conditions.

12. The non-transitory computer readable medium of claim 11, wherein the first user device is associated with the first user in a first enterprise, and wherein the second user device is associated with a second enterprise that is different from the first enterprise.

13. The non-transitory computer readable medium of claim 11, further comprising instructions which, when stored in memory and executed by the one or more hardware processors causes the one or more hardware processors to perform acts of:
comparing user device information to the security conditions to identify one or more unsatisfied conditions, wherein the responses are generated based at least in part on the unsatisfied conditions.

14. The non-transitory computer readable medium of claim 13, wherein the user device information is retrieved from at least one of, a data store, or from a user device.

15. The non-transitory computer readable medium of claim 14, wherein an instance of a trust agent is delivered to the user device to retrieve the user device information.

16. The non-transitory computer readable medium of claim 11, wherein the trust policy comprises one or more device security rules.

17. The non-transitory computer readable medium of claim 16, wherein the one or more device security rules are evaluated based on at least one interaction attribute from the set of interaction attributes.

18. The non-transitory computer readable medium of claim 11, wherein at least one of the responses to the second user device indicates that at least one of the interactions is allowed, or that at least one of the interactions is blocked.

19. A system for performing policy-based user device security checks, the system comprising:
a storage device having stored thereon a sequence of instructions; and
one or more hardware processors in a collaboration system that manages a plurality of content objects that are shared by multiple users at corresponding user devices, the one or more hardware processors to execute the sequence of instructions to cause the one or more hardware processors to perform a set of acts, the set of acts comprising,
establishing a trust policy that governs interactions over a plurality of content objects in a collaboration system, wherein the trust policy manages sharing of a content object from the plurality of content objects that is uploaded by a first user from a first user device with a second user at a second user device, the trust policy defining a security condition with regard to the content object uploaded by the first user at the first user device for access by the second user at the second user device based at least in part on characteristics of the second user device, and the trust policy is directed to interactions for multiple types of devices comprising at least a first type of device and a second type of device, wherein the first type of device comprises managed devices and the second type of device comprises unmanaged devices wherein a managed device is a user device of managed users of an enterprise entity who are characterized by at least a set of attributes stored in a set of user profiles and use their respective user devices to collaborate over the content objects in a content management system within the enterprise entity and is preauthorized to access the content object and an unmanaged device is not preauthorized to access the content object having users external to the enterprise entity that are not managed users of the content management system;
receiving the content object from the first user device, the content object being uploaded to the collaboration system;
configuring access permissions to allow sharing of the content object with the second user;
gathering, upon receiving an interaction event raised by the second user device of the second user, a set of interaction attributes associated with the interaction event;
applying the trust policy to the set of interaction attributes to determine access permission to the content object by:
granting access permission, when the second user device of the second user is a managed device, to the content object uploaded by the first user of the first user device, and
determining, when the second user device of the second user is an unmanaged device, whether an applicable security conditions that correspond to the interaction events is met for permitting access by the second user at the second user device to the content object that was uploaded by the first user at the first user device, wherein permission for access is based at least upon the characteristics of the second user device; and
generating responses to the interaction events, the responses being generated based at least in part on the security conditions.

20. The system of claim 19, wherein the first user device is associated with the first user in a first enterprise, and wherein the second user device is associated with a second enterprise that is different from the first enterprise.

* * * * *